United States Patent [19]

Bamberger et al.

[11] 4,237,105

[45] Dec. 2, 1980

[54] THERMOCHEMICAL CYCLIC SYSTEM FOR SPLITTING WATER AND/OR CARBON DIOXIDE BY MEANS OF CERIUM COMPOUNDS AND REACTIONS USEFUL THEREIN

[75] Inventors: Carlos E. Bamberger, Oak Ridge; Paul R. Robinson, Knoxville, both of Tenn.

[73] Assignee: The United States of America as represented by the United States Department of Energy, Washington, D.C.

[21] Appl. No.: 50,379

[22] Filed: Jun. 20, 1979

[51] Int. Cl.³ .............................................. C01B 1/02
[52] U.S. Cl. .................................... 423/306; 423/579; 423/648 R
[58] Field of Search ............... 423/306, 311, 598, 579, 423/648 R

[56] References Cited
U.S. PATENT DOCUMENTS

| 3,927,192 | 12/1975 | Bamberger et al. | 423/648 R |
| 3,929,979 | 12/1975 | Bamberger et al. | 423/648 R |
| 4,180,555 | 12/1979 | Bamberger et al. | 423/57.9 |

*Primary Examiner*—Wayne A. Langel
*Attorney, Agent, or Firm*—James E. Denny; Stephen D. Hamel; Allen H. Uzzell

[57] ABSTRACT

A thermochemical cyclic process for producing hydrogen from water comprises reacting ceric oxide with monobasic or dibasic alkali metal phosphate to yield a solid reaction product, oxygen and water. The solid reaction product, alkali metal carbonate or bicarbonate, and water, are reacted to yield hydrogen, ceric oxide, carbon dioxide and trialkali metal phosphate. Ceric oxide is recycled. Trialkali metal phosphate, carbon dioxide and water are reacted to yield monobasic or dibasic alkali metal phosphate and alkali metal bicarbonate, which are recycled. The cylic process can be modified for producing carbon monoxide from carbon dioxide by reacting the alkali metal cerous phosphate and alkali metal carbonate or bicarbonate in the absence of water to produce carbon monoxide, ceric oxide, carbon dioxide and trialkali metal phosphate. Carbon monoxide can be converted to hydrogen by the water gas shift reaction.

9 Claims, 2 Drawing Figures

THERMOCHEMICAL CYCLIC SYSTEM FOR SPLITTING WATER AND/OR CARBON DIOXIDE BY MEANS OF CERIUM COMPOUNDS AND REACTIONS USEFUL THEREIN

BACKGROUND OF THE INVENTION

Field of the Invention

This invention is a result of a contract with the United States Department of Energy.

It relates generally to the art of thermochemical hydrogen production. Hydrogen is presently considered to be an attractive energy agent to be developed for future use. Hydrogen has many attributes which make it a logical replacement for fossil fuels which are being rapidly consumed and are becoming increasingly expensive. The combustion of hydrogen produces no obnoxious products and thus no harm to the environment. Existing energy transport means and energy consuming equipment can be adapted to a hydrogen-based energy system using technology presently available. Natural gas pipelines, for example, can be converted to hydrogen carrying pipelines with minor modifications. Experimental automobiles are operating with modified conventional internal combustion engines using hydrogen as a fuel. As the prospect of hydrogen utilization becomes increasingly likely, means for producing hydrogen need to be upgraded and increased.

Description of the Prior Art

Conventionally, hydrogen has been produced by the electrolysis of water. Electrolysis, however, is highly inefficient in view of the less than 40 percent efficiency for electricity production coupled with an efficiency of about 80 percent for electrolysis. Inherent in the electrolytic production of hydrogen is the general futility of using one energy source, typically fossil fuels at present, to produce electricity which is then ultimately used to produce hydrogen at the point of electrolysis. The disadvantages of excess consumption of fossil fuels are obviously not overcome by such a process.

Chemical processes for the direct conversion of fossil fuels and water into hydrogen are presently feasible technically and overcome many of the inefficiencies and disadvantages of electrolysis. However, prudence indicates that fossil fuels should be preserved as much as possible for long term pharmaceutical, chemical and metallurgical requirements.

Thermochemical processes present the most attractive method for producing hydrogen. Using this technique, water is broken down into hydrogen and oxygen by a series of chemical reactions not involving the use of fossil fuels. This series of reactions is preferably carried out in a closed cyclic manner in which all products except hydrogen and oxygen are reused as reactants in other reactions. One such process, disclosed in U.S. Pat. No. 3,490,871, utilizes the reaction of cesium with water to release hydrogen.

Another such process, disclosed by Grimes et al in U.S. Pat. No. 3,919,406, involves the reaction of copper and magnesium chlorides with water to produce hydrogen in a closed cyclic manner.

Another such process is disclosed by Bamberger et al in U.S. Pat. No. 3,927,192. The process therein disclosed comprises reacting chromium oxide with an alkali metal hydroxide to produce hydrogen, water and alkali metal chromate as reaction products.

Bamberger et al (U.S. Pat. No. 3,929,979) also disclose a cyclic process for splitting water wherein magnetite is reacted with an alkali metal hydroxide to give hydrogen, alkali metal ferrate and water as products.

Bamberger et al, in U.S. Pat. No. 3,996,343, disclose the production of hydrogen in a closed chemical cycle for the thermal decomposition of water by reaction of water with chromium sesquioxide and strontium oxide. Bamberger et al (U.S. Pat. No. 4,005,184) employ chromium and barium compounds in a thermochemical process for producing hydrogen.

Bamberger et al in commonly assigned U.S. Pat. No. 4,169,884 issued Oct. 2, 1979, describe a process for producing hydrogen using copper and barium hydroxide.

Bamberger et al in commonly assigned U.S. Pat. No. 4,180,555 issued Dec. 25, 1979, describe a process for producing hydrogen from water using cobalt and barium compounds. The use of cerium and titanium compounds in a thermochemical cycle for producing hydrogen from water is set forth in commonly assigned U.S. application Ser. No. 47,447 entitled "Thermochemical Cycle for Water Decomposition Based upon Ce-O-Ti Compounds," filed in the name of Carlos E. Bamberger.

Ishii et al (U.S. Pat. No. 4,098,875) produce hydrogen thermochemically from water using tri-iron tetraoxide and hydrogen bromide as the main cyclic reaction media. The use of barium iodide, carbon dioxide and ammonia as cyclic reaction media is disclosed in U.S. Pat. No. 3,996,342.

OBJECTS OF THE INVENTION

It is an object of any thermochemical process to use heat directly from an energy producing facility requiring no fossil fuels, such as a nuclear reactor or solar furnace. The upper temperature limit for these sources is about 1300° K. for a high-temperature gas-cooled nuclear reactor and about 3500° K. for a solar furnace.

It is an object of this invention to provide a novel process for producing hydrogen from water or carbon monoxide from carbon dioxide.

It is a further object of this invention to provide a cyclic thermochemical process for splitting water into hydrogen and oxygen or for splitting carbon dioxide into carbon monoxide and oxygen.

It is a further object to provide novel chemical reactions useful in such processes. Another object is to provide embodiments of the foregoing processes wherein all reactions are carried out at temperatures below about 1300° K.

SUMMARY OF THE INVENTION

In one aspect, this invention comprises a novel method for producing a trialkali metal cerous phosphate comprising reacting ceric oxide with a compound selected from the group of monobasic alkali metal phosphates, dibasic alkali metal phosphates, alkali metal pyrophosphates and alkali metal metaphosphates at a temperature above about 650° C. to cause the formation of a trialkali metal cerous phosphate.

In another aspect, this invention comprises a novel method for producing hydrogen comprising reacting trialkali metal cerous phosphate with a reactant selected from the group of alkali metal carbonates and alkali metal bicarbonates in the presence of water at a temperature above about 650° C. to cause the formation of gaseous hydrogen.

In another aspect, this invention comprises a novel method for producing carbon monoxide comprising reacting trialkali metal cerous phosphate with a reactant selected from the group of alkali metal carbonates and alkali metal bicarbonates in a substantially water-free environment at a temperature above about 650° C. to cause the formation of gaseous carbon monoxide.

In another aspect, this invention comprises a cyclic process for producing hydrogen comprising the steps of: (a) reacting ceric oxide with a compound selected from the group of monobasic alkali metal phosphates, dibasic alkali metal phosphates, alkali metal pyrophosphates and alkali metal metaphosphates, to yield oxygen, water and a solid product; (b) reacting the thus-produced solid product with a reactant selected from the group of alkali metal carbonates and alkali metal bicarbonates in the presence of water to yield ceric oxide, trialkali metal phosphate, hydrogen, and carbon dioxide; (c) reacting the thus-produced trialkali metal phosphate with water and carbon dioxide to yield alkali metal bicarbonate and monobasic or dibasic alkali metal phosphate; (d) recycling ceric oxide produced in step (b) to step (a); and (e) recycling monobasic or dibasic alkali metal phosphate produced in step (c) to step (a). The alkali metal bicarbonate produced in step (c) can be recycled to step (b) or decomposed into water, alkali metal carbonate, for recycle to step (b), and carbon dioxide, for recycle to step (c).

In still another aspect, this invention comprises a cyclic process for producing carbon monoxide, comprising the steps of: (a) reacting ceric oxide with a compound selected from the group of monobasic alkali metal phosphates and dibasic alkali metal phosphates to yield oxygen, water, and a solid product; (b) reacting the thus-produced solid product with a reactant selected from the group of alkali metal carbonates and bicarbonates in a substantially water-free environment to yield ceric oxide, trialkali metal phosphate, carbon monoxide and carbon dioxide; (c) reacting the thus-produced trialkali metal phosphate with water and carbon dioxide to yield alkali metal bicarbonate and monobasic or dibasic alkali metal phosphate; (d) recycling ceric oxide produced in step (b) to step (a); and (e) recycling monobasic or dibasic alkali metal phosphate to step (a). The alkali metal bicarbonate produced in step (c) can be recycled to step (b) or can be thermally decomposed into water, alkali metal carbonate for recycle to step (b), and carbon dioxide to recycle to step (c).

In the cyclic processes for producing hydrogen or carbon monoxide the monobasic or dibasic alkali metal phosphate recycled from step (c) to step (a) can be recycled either directly or indirectly by first converting (e.g. by heating) the dibasic phosphate to an alkali metal pyrophosphate, or the monobasic phosphate to an alkali metal metaphosphate. When sodium or potassium are the alkali metals used in the cycles, the solid product resulting from the first reaction is a mixture of alkali metal cerous phosphate and either cerous phosphate or trialkali metal phosphate, as explained more fully herein. When the alkali metal used in the cycle is lithium, the solid product resulting from the first reaction is a mixture of cerous phosphate and trilithium phosphate.

DETAILED DESCRIPTION OF THE INVENTION

Figure 1:
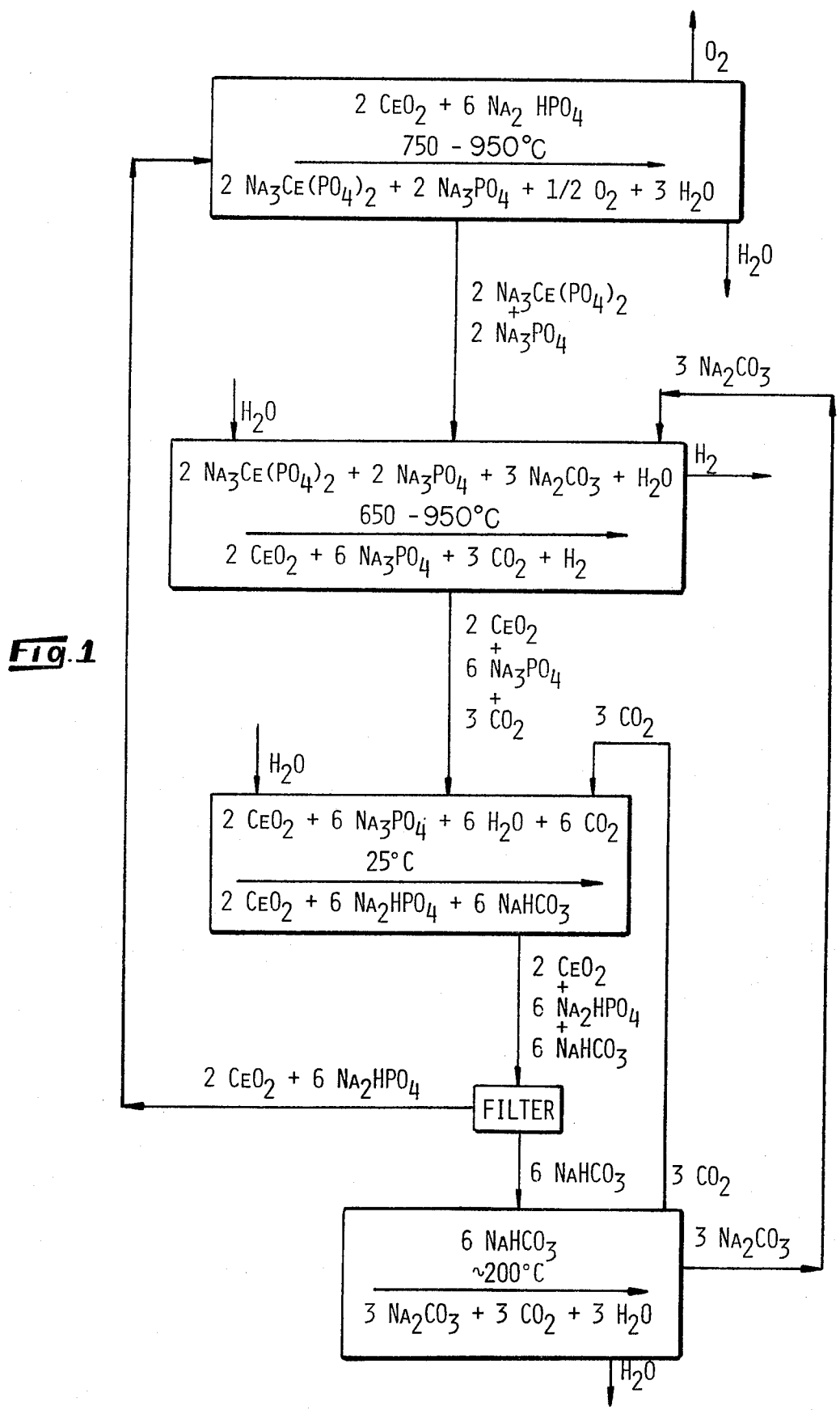
FIG. 1 is a flow chart of an embodiment of the cyclic process for converting water to hydrogen and oxygen in accordance with this invention.

As used in the specification and claims ceric oxide means cerium (IV) oxide or $CeO_2$. Cerous phosphate means cerium (III) phosphate or $CePO_4$. The alkali metals represented by M can be, for example, sodium, lithium, or potassium. Monobasic alkali metal phosphates are compositions of the formula $MH_2PO_4$. Dibasic alkali metal phosphates are compounds of the formula $M_2HPO_4$. Alkali metal carbonates are compounds of the formula $M_2CO_3$. Alkali metal bicarbonates are compounds of the formula $MHCO_3$. Alkali metal pyrophosphates are compositions of the formula $M_4P_2O_7$, and alkali metal metaphosphates are compositions of the formula $(MPO_3)_3$. Trialkali metal cerous phosphates are compositions of the formula $M_3Ce(PO_4)_2$.

The first step in the cyclic processes of this invention comprises the reaction of ceric oxide with monobasic or dibasic alkali metal phosphate. When a dibasic alkali metal phosphate is used, the reaction products are trialkali metal cerous phosphate, trialkali metal phosphate, water, and oxygen. When a monobasic alkali metal phosphate is used, the reaction products are trialkali metal cerous phosphate and cerous phosphate, water, and oxygen. Reaction 1 can be represented by the following equations:

Step 1

1(a) $2 CeO_2 + 6 M_2HPO_4 \rightarrow 2M_3Ce(PO_4)_2 + 2M_3PO_4 + 3 H_2O + \frac{1}{2}O_2$ 1(b) $2 CeO_2 + 3MH_2PO_4 \rightarrow M_3Ce(PO_4)_2 + CePO_4 + 3 H_2O + \frac{1}{2}O_2$ The reactions of step 1 can be carried out by mixing the solid reactants and heating them at a temperature above about 650° C. When the dibasic phosphate salt is used (step 1a) the preferred temperature range is about 750°–950° C. When monobasic phosphate salt is used (step 1b) the preferred reaction temperature is in the range of 650°–850° C. For both embodiments of step 1, the oxygen yield is enhanced as the temperature increases.

The second step of the cyclic process involves the reaction of the solid trialkali metal cerous phosphate of step 1 with an alkali metal carbonate or bicarbonate at temperatures above about 650° C., preferably about 650°–950° C. In embodiment (a) trialkali metal phosphate is present with the reactants but does not participate. If step 2 is carried out in the presence of water or steam, hydrogen gas is produced. If step 2 is carried out in a substantially water-free environment, carbon monoxide is formed as one of the products. For purposes of this invention, the phrase "substantially water-free environment" in connection with claim 2 is defined as an environment having a water vapor pressure, generally less than 0.01 psi, which is sufficiently low to result in the formation of CO in step (b) in molar quantities at least about 100 times the amount of hydrogen produced. The following equations illustrate step 2 for the reaction products of steps 1a and 1b both with and without water vapor present, using both carbonates and bicarbonates. The temperatures for the reactions are the preferred temperatures when the alkali metal used in the cycle is sodium.

Step 2

2(a) water vapor present, using $M_2CO_3$;

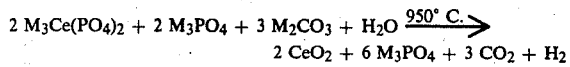
$$2\ M_3Ce(PO_4)_2 + 2\ M_3PO_4 + 3\ M_2CO_3 + H_2O \xrightarrow{950°\ C.} 2\ CeO_2 + 6\ M_3PO_4 + 3\ CO_2 + H_2$$

2(a) water vapor present, using $MHCO_3$;

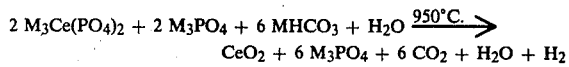
$$2\ M_3Ce(PO_4)_2 + 2\ M_3PO_4 + 6\ MHCO_3 + H_2O \xrightarrow{950°\ C.} CeO_2 + 6\ M_3PO_4 + 6\ CO_2 + H_2O + H_2$$

2(a) no water vapor present, using $M_2CO_3$;

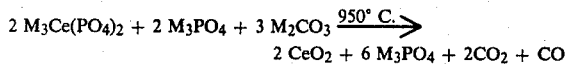
$$2\ M_3Ce(PO_4)_2 + 2\ M_3PO_4 + 3\ M_2CO_3 \xrightarrow{950°\ C.} 2\ CeO_2 + 6\ M_3PO_4 + 2CO_2 + CO$$

2(a) no water vapor present, using $MHCO_3$ (product water removed from reaction zone prior to reaching reaction temperature);

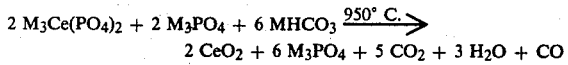
$$2\ M_3Ce(PO_4)_2 + 2\ M_3PO_4 + 6\ MHCO_3 \xrightarrow{950°\ C.} 2\ CeO_2 + 6\ M_3PO_4 + 5\ CO_2 + 3\ H_2O + CO$$

2(b) water vapor present, using $M_2CO_3$;

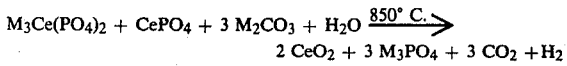
$$M_3Ce(PO_4)_2 + CePO_4 + 3\ M_2CO_3 + H_2O \xrightarrow{850°\ C.} 2\ CeO_2 + 3\ M_3PO_4 + 3\ CO_2 + H_2$$

2(b) water vapor present, using $MHCO_3$;

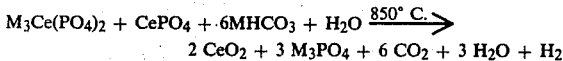
$$M_3Ce(PO_4)_2 + CePO_4 + 6MHCO_3 + H_2O \xrightarrow{850°\ C.} 2\ CeO_2 + 3\ M_3PO_4 + 6\ CO_2 + 3\ H_2O + H_2$$

2(b) no water vapor present, using $M_2CO_2$;

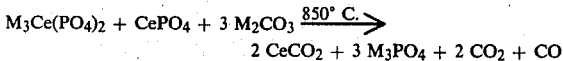
$$M_3Ce(PO_4)_2 + CePO_4 + 3\ M_2CO_3 \xrightarrow{850°\ C.} 2\ CeCO_2 + 3\ M_3PO_4 + 2\ CO_2 + CO$$

2(b) no water vapor present, using $MHCO_3$ (product water removed from reaction zone prior to reaching reaction temperature);

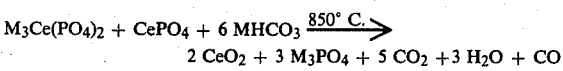
$$M_3Ce(PO_4)_2 + CePO_4 + 6\ MHCO_3 \xrightarrow{850°\ C.} 2\ CeO_2 + 3\ M_3PO_4 + 5\ CO_2 + 3\ H_2O + CO$$

From the above reactions it is seen that in all cases the solid reaction products are $CeO_2$ and $M_3PO_4$ and the gaseous products contain $CO_2$ and either $H_2$ or CO. $H_2O$ is present in the reaction products whenever alkali metal bicarbonate is used and of course whenever the reaction is conducted in the presence of water vapor. When CO is the desired product and alkali metal bicarbonate is used, the water resulting from the decomposition of the bicarbonate should be removed before the reaction temperature is reached, for example, at about 200° C. Alternatively, the reaction atmosphere can be purged with inert gas, e.g., nitrogen, to remove water vapor and other gaseous products from the reaction environment.

It is seen that in each embodiment of step 2 the reaction products contain a gaseous mixture of $CO_2$ and the product $H_2$ or CO, and in some cases $H_2O$. While this gaseous mixture can be separated, e.g. cryogenically, it is preferable that the gaseous mixture and the solid reaction products be employed in step 3 without separation, resulting in the removal of carbon dioxide and some or all of the water vapor from the gaseous mixture.

Step 3 can be performed to cause the formation of a dibasic alkali metal phosphate for embodiment (a) of steps 1 and 2, or to form a monobasic alkali metal phosphate for embodiment (b) of steps 1 and 2, depending upon the relative amounts of $CO_2$ and $M_3PO_4$ in the reaction mixture. In either case step 3 should be performed in the presence of liquid water at about 0°–100° C., preferably about 25° C., and with a $CO_2$ partial pressure of at least about one-half atmosphere for improved product yields. Step 3 is illustrated for embodiments (a) and (b) as follows:

Step 3

3(a) $2\ CeO_2 + 6\ M_3PO_4 + 6\ H_2O + 6\ CO_2 \rightarrow 2\ CeO_2 + 6\ M_2HPO_4 + 6\ MHCO_3$ 3(b) $2CeO_2 + 3\ M_3PO_4 + 6\ H_2O + 6\ CO_2 \rightarrow 2\ CeO_2 + 3\ MH_2PO_4 + 6\ MHCO_3$ Step 3 can be conducted in an entirely aqueous medium and separation of alkali metal bicarbonates and monobasic or dibasic phosphates can be accomplished by successive recrystallization. Sodium bicarbonate and dibasic sodium phosphate can be separated to about 90% efficiency in a single crystallization at 0° C., with sodium bicarbonate remaining dissolved in the aqueous phase. It is preferred, however, that step 3 be conducted in a mixture of water and an inexpensive organic solvent such as acetone, methanol, ethanol, propanol, isopropanol, butanol, etc., with methanol preferred. The relative amounts of organic solvent and water effective to cause clean separation depend upon the alkali metal used and whether a dibasic or monobasic alkali metal phosphate is employed, as will be described herein. The reaction products of step 3 are filtered and solid $CeO_2$ and monobasic or dibasic alkali metal phosphate is recycled to step 1. The alkali metal bicarbonate in solution can be either directly recycled to step 2 or can be heated to about 200° C. to cause the decomposition of alkali metal bicarbonate to alkali metal carbonate as shown in the following step 4.

Step 4

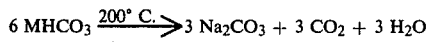
$$6\ MHCO_3 \xrightarrow{200°\ C.} 3\ Na_2CO_3 + 3\ CO_2 + 3\ H_2O$$

The methanol is recovered from the gaseous phase for recycle to step 3. If the $MeOH/H_2O$ alkali metal bicarbonate solution is recycled directly to step 2, the methanol can be recovered either before or after addition to the step 2 reactants. For example, the heating rate of step 2 can be controlled to permit recovery of $H_2O$ and methanol prior to reaching reaction temperature, i.e., prior to reaching about 650° C. In this manner water can be removed from the reaction zone when the CO is the desired product of step 2. When $H_2$ is the desired product of step 2, an atmosphere of steam is maintained in the reaction zone.

The conditions for carrying out the steps of the cyclic process and for effecting separation of the bicarbonate product of step 3 are dependent upon alkali metal used in the process. The choice of alkali metal is expected to be based primarily upon the ease of separations and the initial material cost, with sodium presently preferred.

When the alkali metal is sodium and the dibasic phosphate salt is used, steps 1 and 2 (i.e., the (a) embodiments) are performed at about 750°–950° C. with about 950° C. preferred. When monobasic sodium phosphate is used (i.e., the (b) embodiments), steps 1 and 2 are performed at about 650°–850° C. with about 850° C. preferred. When step 3 (both (a) and (b)) is performed in water, slightly soluble $Na_2HPO_4$ or $NaH_2PO_4$ can be crystallized at about 0° C. from the product solution in one step with about 90% separation efficiency. Successive crystallizations (i.e., fractional crystallization) provide more complete separation. In a preferred embodiment, step 3 is conducted at about 0° to 30° C. in a $H_2O$/organic solvent (preferably $H_2O/CH_3OH$) at a $H_2O$/solvent volume ratio of from 1:4 to 4:1, with about 1:1 preferred. The $Na_2HPO_4$ or $NaH_2PO_4$ can be crystallized from 1:1 $H_2O/CH_3OH$ solution with essentially 100% efficiency, leaving $NaHCO_3$ in solution. Step 3 using sodium salts is preferably conducted under a $CO_2$ partial pressure of 0.5 atmosphere or more, with about one atmosphere $CO_2$ providing satisfactory yield.

When the alkali metal is lithium, the cycle is carried out using the monobasic phosphate $LiH_2PO_4$. Steps 1 and 2 using lithium salts (embodiments (b)) are performed at about 580°–780° C., with about 780° C. preferred. Step 3 requires a $CO_2$ partial pressure of at least about 2 atmospheres with 3 or more atmospheres $CO_2$ preferred. Because $LiH_2PO_4$ is more soluble in water than $LiHCO_3$, the separation of the step 3 products is greatly aided when the step is conducted in a mixture of $H_2O$ and one of the aforementioned organic solvents, preferably methanol, a $H_2O$/solvent volume ratio of 1:1 to 1:10 with 1:9 $H_2O/CH_3OH$ preferred. $LiH_2PO_4$ can be crystallized from 1:9 $H_2O/CH_3OH$ at 0° C. with about 95% recovery, with improved recovery obtainable by successive crystallizations. The $Li_2HPO_4$ salt does not exist, however, the pyrophosphate $Li_4P_2O_7$ could be used in step 1 in which case $LiH_2PO_4$ is reacted with a mixture of $CeO_2$ and $Li_3PO_4$ at a temperature of above 400° C. to form a mixture of $CeO_2$ and $Li_4P_2O_7$. The reaction between $CeO_2$ and $Li_4P_2O_7$ is then conducted at about 600°–850° C., with 850° C. preferred. The reactions using $Li_4P_2O_7$ as a starting material are as follows:

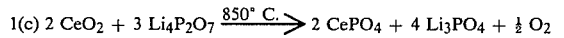
1(c) $2\ CeO_2 + 3\ Li_4P_2O_7 \xrightarrow{850°\ C.} 2\ CePO_4 + 4\ Li_3PO_4 + \frac{1}{2}\ O_2$ 2(c) with steam present

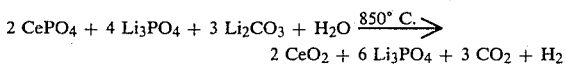
$2\ CePO_4 + 4\ Li_3PO_4 + 3\ Li_2CO_3 + H_2O \xrightarrow{850°\ C.} 2\ CeO_2 + 6\ Li_3PO_4 + 3\ CO_2 + H_2$ 2(c) with no steam present $2\ CePO_4 + 4\ Li_3PO_4 + 3\ Li_2CO_3 \rightarrow 2\ CeO_2 + 6\ Li_3PO_4 + 2\ CO_2 + CO$ 3(c) $2\ CeO_2 + 6\ Li_3PO_4 + 6\ H_2O + 6\ CO_2 \rightarrow 2\ CeO_2 + 3\ LiH_2PO_4 + 3\ Li_3PO_4 + 6\ LiHCO_3$ Reaction 3(c) is conducted in water at 0°–100° C., preferably at about 25° C. and the product mixture filtered to separate insoluble $CeO_2$ and $Li_3PO_4$ from water-soluble $LiH_2PO_4$ and $LiHCO_3$. The aqueous solution of $LiHCO_3$ and $LiH_2PO_4$ can be separated by fractional crystallization at 0° C., separating $LiH_2PO_4$ from the less soluble $LiHCO_3$. The $LiHCO_3$ is recycled with or without decomposition to $Li_2CO_3$, to step 2(c). The $LiH_2PO_4$ is contacted with the $CeO_2$–$Li_3PO_4$ mixture and heated to above about 400° C. to form $CeO_2$, $Li_4P_2O_7$ and $H_2O$, via the reaction:

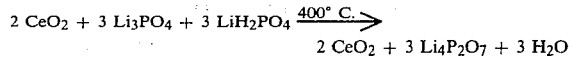
$2\ CeO_2 + 3\ Li_3PO_4 + 3\ LiH_2PO_4 \xrightarrow{400°\ C.} 2\ CeO_2 + 3\ Li_4P_2O_7 + 3\ H_2O$ When the alkali metal is potassium, the reaction sequences are the same as for sodium, except that step 1 and the embodiments of step 2 must be conducted at higher temperatures, about 1000°–1200° C. with about 1200° C. preferred. It has been found, however, that both reactions 1 and 2 utilizing potassium salts, can be conducted at about the same temperature of the steps using sodium salts if a quantity of $Li_3PO_4$ is present in both steps 1 and 2 to act as a "mineralizer." The $Li_3PO_4$ should be present in an amount about 5–20 mole percent, preferably about 10 mole percent of the quantity of $KH_2PO_4$ or $K_2HPO_4$ present. The $Li_3PO_4$ does not appear to enter into any of the reactions and follows the cerium compounds through the cycle as a solid. When $Li_3PO_4$ is present, step 3 should be performed at a $CO_2$ partial pressure of about 0.5 to 1.0 atmospheres. If step 3 is performed at a $CO_2$ partial pressure of above about 1.0 atmospheres some of the $Li_3PO_4$ will go into solution and participate in the reaction, as described in the lithium embodiment herein, and greatly complicate the separation of the products of step 3. When potassium compounds are used in the cycle, either with or without the $Li_3PO_4$ mineralizer, step 3 should be conducted in a mixture of $H_2O$ and the aforementioned organic solvents, preferably $H_2O/CH_3OH$ in volume ratio of about 1:4 to 1:9, preferably about 1:4, $H_2O/CH_3OH$. When the dibasic phosphate $K_2HPO_4$ is used in the cycle, and step 3 is conducted in about 1:4 (by volume) $H_2O/CH_3OH$, the $K_2HPO_4$ remains dissolved in the $H_2O/CH_3OH$ solution and the $KHCO_3$ is present with $CeO_2$ in the solid phase. This solid mixture can be contacted with $H_2O$, at 0° to 100° C. to dissolve $KHCO_3$ which can be recycled, with or without decomposition to step 2. The $CeO_2$ and $K_2HPO_4$ are both recycled to step 1 after recovery of $CH_3OH$. One advantage of the use of potassium compounds in the cycle is that the monobasic potassium phosphate $K_2HPO_4$ is recovered in step 3 as a hydrate having only 0.5 waters of hydration per molecule, whereas $Na_2HPO_4$ has 7 waters of hydration per molecule, thus less water needs to be vaporized from the product of step 3 before or during step 1.

It may be desirable in some cases, for example, to improve the overall heat recovery of the cycle, to transform the monobasic or dibasic phosphate salts from reaction 3 into pyrophosphate or metaphosphate salts prior to conducting the reactions of step 1. This is chemically equivalent to a two-state reaction of step 1 in which the $M_2HPO_4$ is heated to about 200° to 450° C. to cause a formation of pyrophosphate $M_4P_2O_7$ and $H_2O$. The $MH_2PO_4$ is heated to above about 200° C. to cause the formation of a metaphosphate $(MPO_3)_3 + 2\ H_2O$. Of course other condensed phosphates can also be present. The pyro- or metaphosphates are then conducted to reaction 1 wherein they behave in a chemically equivalent manner to the dibasic or monobasic phosphates, producing the same products in the cycle.

When the CO product is produced according to the cycle of this invention, it can be used directly as a fuel. It can be used to decompose water by the water gas shift reaction $CO+H_2O \rightarrow CO_2+H_2$. CO could also be used to react with hydrogen for production of methanol according to well-known methods of the chemical industry, for example,

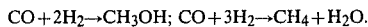

$CO+2H_2 \rightarrow CH_3OH$; $CO+3H_2 \rightarrow CH_4+H_2O$.

DETAILED DESCRIPTION OF THE DRAWINGS

FIG. 1 depicts the cycle (a) in which hydrogen is the product and sodium is the alkali metal, and in which sodium carbonate is used in step 2. In the first step cerium oxide is reacted in the solid phase with dibasic sodium phosphate at about 750°–950° C. to provide sodium cerous phosphate, sodium phosphate, oxygen and water. The oxygen is recovered from the gaseous phase and the water removed from the reaction zone. The solid phase is conducted to reaction 2 wherein it is contacted with water and stream and sodium carbonate at 650°–950° C. The reaction produces ceric oxide plus sodium phosphate, carbon dioxide, and hydrogen. The hydrogen can be recovered separately as shown or can be passed directly to step 3 as hereinbefore described. In step 3 the cerium oxide and hydrogen do not participate in the reaction, wherein sodium phosphate is reacted with water and carbon dioxide to produce dibasic sodium phosphate and sodium bicarbonate. The preferred $CO_2$ pressure for this step is about 1 atmosphere. It is preferred that the cerium oxide and sodium phosphate be contacted with carbon dioxide in the presence of only enough water to dissolve most of the sodium bicarbonate produced so that a solid mixture of cerium oxide dibasic sodium phosphate can be recycled directly to step 1 and only a small amount of water need be evaporated to recover the bicarbonate.

Figure 2:
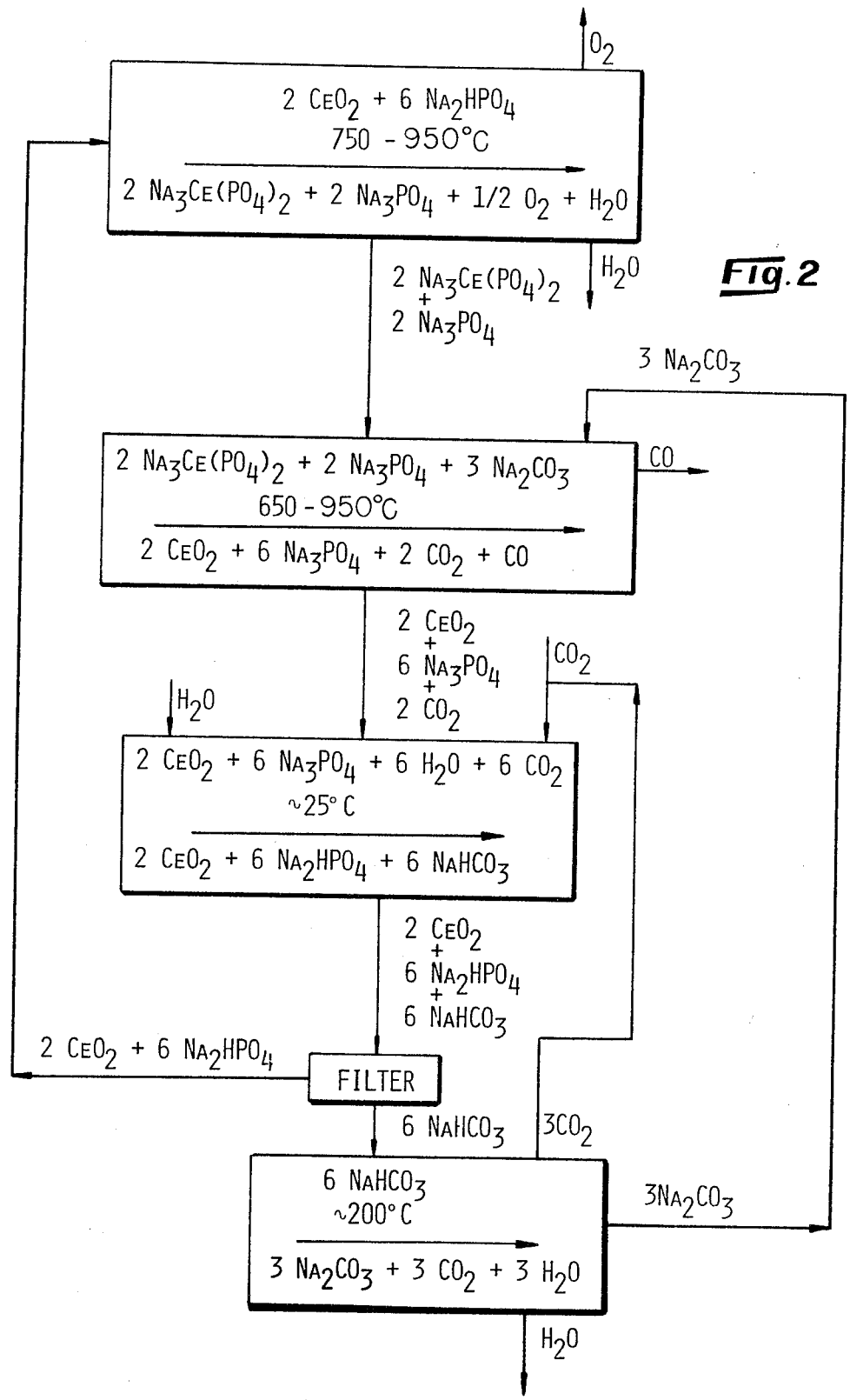
FIG. 2 is a flow chart of an embodiment of the cyclic process of this invention for obtaining carbon monoxide and oxygen from carbon dioxide.

FIG. 2 depicts the cycle (a) in which CO is the product and in which sodium carbonate is used in step 2 with the alkali metal sodium. The first step is performed identically as in FIG. 1. The solid phase is conducted to reaction 2 wherein it is contacted with sodium carbonate in the absence of water vapor at 650°–950° C., producing ceric oxide plus sodium phosphate, carbon dioxide and carbon monoxide. The carbon monoxide can be recovered separately as shown or can be passed directly to step 3 as hereinbefore described. In step 3 the cerium oxide and carbon monoxide do not participate in the reaction, wherein sodium phosphate is reacted with water and carbon dioxide to produce dibasic sodium phosphate and sodium bicarbonate. As in the process of FIG. 1, the preferred $CO_2$ pressure for this step is about 1 atmosphere, and it is preferred that the cerium oxide and sodium phosphate be contacted with carbon dioxide in the presence of only enough water to dissolve most of the sodium bicarbonate produced so that a solid mixture of cerium oxide and dibasic sodium phosphate can be recycled directly to step 1 and only a small amount of water need be evaporated to recover the bicarbonate. If desired, about 5–20 mole percent of lithium phosphate can be added to the $Na_2HPO_4$ to improve the kinetics of reactions 1 and 2 in both FIG. 1 and FIG. 2 embodiments. This lithium phosphate has a low solubility in water and will remain in the solid cerium containing mixture throughout the cycle without requiring special handling separations.

The following examples describe operative procedures for carrying out the reactions of this cycle. They are intended only as illustrative and deal only with the sodium embodiment. The temperatures are set forth in degrees Celcius and all parts and percentages are by weight. The times set forth for the high temperature reactions include the heat-up time of the furnace. Substantially shorter times, approximately 7–10 minutes, are sufficient when the reactions are carried out in a preheated environment.

EXAMPLE 1

Ceric oxide (2.4 g) was reacted with $Na_2HPO_4$ (7.4 g), at continuously increasing temperature (5.4° C./min) in a platinum boat inside a quartz tube heated in a tube furnace. The tube system was provided with a thermocouple well and lines for sparging with argon carrier gas. The exit gas mixture was dried by passage through a column packed with anhydrous $CaSO_4$ and analyzed for oxygen content with a Beckman oxygen analyzer. Oxygen evolution began at about 750° C. and continued to about 950° C. Conversion of ceric oxide and $Na_2HPO_4$ to $Na_3Ce(PO_4)_2$, trisodium phosphate, water and oxygen was essentially complete after 120 minutes. The yield of oxygen was 50 ml (88.5%). The solid products were identified by neutron activation analysis and X-ray diffraction analysis.

EXAMPLE 2

Disodium hydrogen phosphate.2.27 $H_2O$ (19.8 g) was heated in the apparatus used in Example 1 at about 500° C. for one-half hour to yield 14.4 g sodium pyrophosphate ($Na_4P_2O_7$) and water. The residual pyrophosphate was mixed with 8.8 g of ceric oxide and the mixture heated as in Example 1 to give sodium cerous phosphate, sodium phosphate and oxygen, identified as in Example 1. Significant oxygen evolution began at about 660° C. The reaction was essentially complete at about 1000° C. after 80 minutes (79% yield of oxygen).

EXAMPLE 3

Sodium cerous phosphate, trisodium phosphate and sodium pyrophosphate (15 g total), obtained in Example 1, were mixed in the apparatus described in Example 1 with anhydrous sodium carbonate (2.7 g). Water vapor was supplied continuously to the reaction described in Example 1, using argon carrier gas. The sodium pyrophosphate was excess remaining from the formation of the sodium cerous phosphate. The charge was heated at a rate of 5.4° C./min. to a maximum of about 950° C. The exit gases were dried by passage through a water-cooled condenser and anhydrous calcium sulfate and hydrogen was determined quantitatively using a thermal conductivity detector (Gow-Mac Analyzer). A solution containing $Ba(OH)_2$ was used to trap the evolved $CO_2$ as solid $BaCO_3$. Hydrogen evolution began at 650° C. and reached a maximum at about 850° C. The yield of hydrogen was quantitative (154 ml). Ceric oxide and trisodium phosphate in the residue were identified by neutron activation analysis and X-ray diffraction analysis.

EXAMPLE 4

Sodium cerous phosphate and sodium phosphate obtained as in Example 1 (11.3 g) were mixed with 6.6 g of anhydrous sodium carbonate which had been recycled from a run of reaction 3 and heated in the apparatus of Example 1 at a rate of 5.4° C./min. to a maximum of about 850° C. A solution of $Ba(OH)_2$ was used to trap evolved $CO_2$ as solid $BaCO_3$. Evolved carbon monoxide was detected with a thermal conductivity detector. Evolution of carbon monoxide began at about 700° C., but the maximum rate of gas evolution was at about 850°–950° C. The CO yield was 98% (189 ml). The presence of ceric oxide and trisodium phosphate in the solid residue was verified by X-ray diffraction.

EXAMPLE 5

The solid residue from Example 3 was removed from the crucible and treated with 100 ml of water and saturated with carbon dioxide at room temperature, $CO_2$ pressure about 1 atmosphere. The undissolved material (2.4 g) following filtration was ceric oxide. The filtrate contained disodium hydrogen phosphate and sodium bicarbonate, which were separated by fractional crystallization at 0°–22° C. in two crystallization steps.

EXAMPLE 6

Sodium bicarbonate (2.6 g) is decomposed at about 200° C. in the apparatus of Example 1 to sodium carbonate, which is treated with 5.25 g of sodium cerous phosphate and excess water as steam at 650°–750° C. to give hydrogen.

EXAMPLE 7

Recycled sodium carbonate (6.66 g) was mixed with 7.92 g of sodium cerous phosphate and 1.7 grams of trilithium phosphate at 650°–850° C. to liberate carbon monoxide (88% yield).

EXAMPLE 8

The residue from Example 3 was dissolved in a minimal volume (72 ml) of water and saturated with carbon dioxide by maintaining a $CO_2$ vapor pressure at one atmosphere. The residue following filtration was a mixture of ceric oxide and disodium hydrogen phosphate. The aqueous phase contained dissolved sodium bicarbonate.

EXAMPLE 9

Lithium pyrophosphate (8.84 g) and ceric oxide (5 g) are heated at 700°–850° C. in the apparatus described in Example 1 to give oxygen, water and a solid mixture of cerous phosphate and trilithium phosphate. The residue of insoluble salts is treated with lithium bicarbonate (5.95 g) at 650°–800° C. to produce ceric oxide, trilithium phosphate, carbon dioxide and carbon monoxide. The recycling solids are contacted at 25° C. with 100 g of water at 2 atm. of carbon dioxide to yield ceric oxide, trilithium phosphate, lithium dihydrogen phosphate and lithium bicarbonate. The latter two relatively soluble salts are removed from insoluble trilithium phosphate and ceric oxide and separated by fractional crystallization. Residual ceric oxide and trilithium phosphate are mixed with 4.55 g of the separated $LiH_2PO_4$ and heated to 400° C. to give cerous phosphate, lithium pyrophosphate and water, which are recycled.

EXAMPLE 10

A mixture of trilithium phosphate and cerous phosphate obtained as in Example 9 is contacted with 5.95 g of lithium bicarbonate and steam at about 650°–800° C. to form ceric oxide, trilithium phosphate, carbon dioxide and hydrogen. The solid residue is treated as in Example 9.

EXAMPLE 11

A mixture of dipotassium hydrogen phosphate (13.5 g) and ceric oxide (4.14 g) is heated in an apparatus as in Example 1. At about 1000° C., production of oxygen is about 50% complete. 8.8 g of the solid product tripotassium cerous phosphate, and tripotassium phosphate were heated with potassium carbonate (3.81 g) in the presence of steam to about 1000° C. to yield ceric oxide, tripotassium phosphate, carbon monoxide and carbon dioxide (about 98% yield of CO). The solid residue is reacted in the same manner as used for sodium salts.

EXAMPLE 12

Material balances for step 3 of the process were determined experimentally by treating $Na_3PO_4$ with $H_2O$ and $CO_2$. $Na_3PO_4.12\ H_2O$ (38 g) was dissolved in 400 ml of $H_2O$. Carbon dioxide was bubbled through the solution at a rate of about 155 ml/min (1 atm $CO_2$, 22° C.) for 12 hours to assure completion of the reaction.

The resulting solution was evaporated to a volume of 100 ml and cooled to 22° C. The precipitate that formed was separated from the solution by filtration. Analysis of the solids by acidimetric titration showed the composition to be 19.0 g of $Na_2HPO_4.10\ H_2O$, 0.11 g of $NaH_2PO_4$ and 42 g of $NaHCO_3$. Evaporation of the filtrate to 20 ml and crystallization of 24° C. gave 0.48 g of $Na_2HPO_4.18\ H_2O$ and 2.18 g of $NaHCO_3$ (acidimetric titration). A third solid fraction, obtained from the remaining filtrate by partial evaporation and cooling to 0° C., contained 4.82 g of $Na_2HPO_4$, 3.7 g of water and 1.92 g of $NaHCO_3$. The final solid fraction was obtained by evaporating the remaining filtrate to dryness. This solid fraction contained 0.27 g of $Na_2HPO_4.4\ H_2O$ and 1.87 g of $NaHCO_3$. The total recovered product, exclusive of analytical samples, was 24.57 g of $Na_2HPO_4$, 0.11 g of $NaH_2PO_4$ and 6.39 g of $NaHCO_3$.

The preceding examples can be repeated with similar success by substituting the generically and specifically described reactants and/or operating conditions of this invention for those used in the preceding examples.

From the foregoing description, one skilled in the art can easily ascertain the essential characteristics of this invention and, without departing from the spirit and scope of the invention herein described, can make modifications of the reaction conditions of the various steps and can alter the product separations and recycle the material in the cycle in various ways. Such modifications are contemplated as equivalents of the invention herein claimed and described.

What is claimed is:

1. A method for producing a trialkali metal cerous phosphate comprising reacting ceric oxide with a compound selected from the group consisting of monobasic alkali metal phosphates, dibasic alkali metal phosphates, alkali metal pyrophosphates, and alkali metal metaphosphates at a temperature above about 650° C. to cause the formation of a trialkali metal cerous phosphate.

2. A method for producing hydrogen comprising reacting a trialkali metal cerous phosphate with a first reactant selected from the group consisting of trialkali metal phosphates and cerous phosphates and a second reactant selected from the group consisting of alkali metal carbonates and alkali metal bicarbonates in the presence of water at a temperature above about 650° C. to cause the formation of gaseous hydrogen.

3. A cyclic process for producing hydrogen comprising the steps of (a) reacting ceric oxide with a compound selected from the group consisting of monobasic alkali metal phosphates, dibasic alkali metal phosphates, alkali metal pyrophosphates, and alkali metal metaphosphates to yield oxygen, water and a solid product, (b) reacting the thus-produced solid product with a reactant selected from the group consisting of alkali metal carbonates and alkali metal bicarbonates in the presence of water to yield ceric oxide, trialkali metal phosphate, hydrogen and carbon dioxide, (c) reacting the thus-produced trialkali metal phosphate with water and carbon dioxide to yield alkali metal bicarbonate and monobasic or dibasic alkali metal phosphate, (d) recycling ceric oxide produced in step (b) to step (a), and (e) recycling monobasic or dibasic alkali metal phosphate produced in step (c) to step (a).

4. The process of claim 1 in which step (a) is carried out in the presence of trilithium phosphate in an amount of about 5–20 mole percent of said monobasic potassium phosphate.

5. The process of claim 3 further comprising recycling alkali metal bicarbonate produced in step (c) to step (b).

6. The process of claim 3 further comprising heating said alkali metal bicarbonate produced in step (c) to cause the formation of alkali metal carbonate, carbon dioxide, and water; recycling the thus-produced carbon dioxide to step (c); and recycling the thus-produced alkali metal carbonate to step (b).

7. The process of claim 3 in which said alkali metal is sodium.

8. The process of claim 3 in which said alkali metal is potassium, and step (a) comprises reacting ceric oxide with monobasic potassium phosphate to form oxygen, tripotassium cerous phosphate and cerous phosphate.

9. The process of claim 3 in which said alkali metal is lithium, step (a) comprises reacting ceric oxide with monobasic lithium phosphate, lithium metaphosphate, or lithium pyrophosphate to form oxygen, cerous phosphate, and trilithium phosphate, and step (c) is carried out under at least about two atmospheres of carbon dioxide partial pressure.

* * * * *